J. J. HAYDEN.
ANIMAL TRAP.
No. 179,788. Patented July 11, 1876.
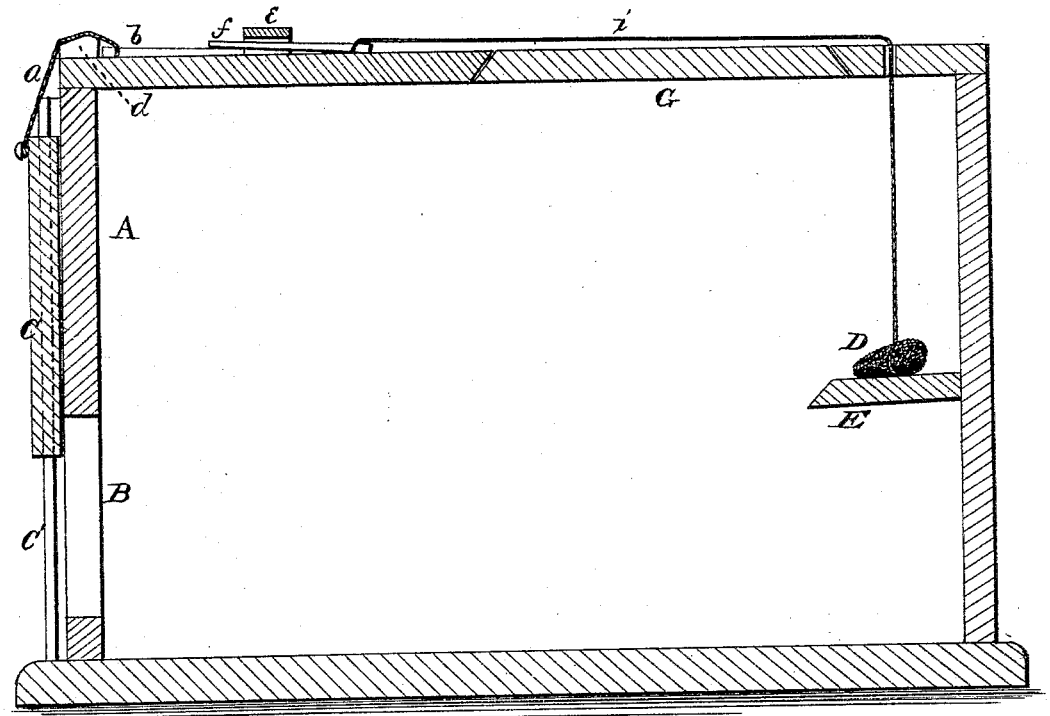
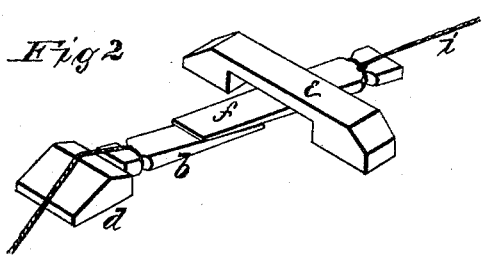
WITNESSES
Franck L. Durand
Henry N. Miller
INVENTOR
J. J. Hayden
By T. H. Alexander
Attorney.

UNITED STATES PATENT OFFICE.

JOSEPH J. HAYDEN, OF SMITHFIELD, PENNSYLVANIA.

IMPROVEMENT IN ANIMAL-TRAPS.

Specification forming part of Letters Patent No. 179,788, dated July 11, 1876; application filed May 18, 1876.

*To all whom it may concern:*

Be it known that I, JOSEPH J. HAYDEN, of Smithfield, in the county of Fayette and State of Pennsylvania, have invented certain new and useful Improvements in Animal-Traps; and I do hereby declare that the following is a full, clear, and exact description thereof, reference being had to the accompanying drawings, and to the letters of reference marked thereon, which form part of this specification.

My invention consists in the construction and arrangement of an animal-trap, as will be hereinafter more fully set forth.

In the annexed drawing, Figure 1 is a longitudinal section of my trap. Fig. 2 is a perspective view of the tripping device.

A represents a box of any suitable dimensions, provided with an entrance, B, at one end. This entrance is closed by means of a sliding door, C, moving on vertical guides $C'$. $a$ is a string tied to the upper edge of the gate C, and its other end fastened to a small wooden wedge, $b$. When the gate is raised the wedge $b$ is laid with its large end against a block, $d$, on the top of the box A. Another wedge, $f$, is passed under a grooved or slotted block, $e$, and over the end of the wedge $b$, to hold the same down. The wedge $f$ is secured to a string, $i$, which passes down through the rear end of the box, and is tied to an ear of corn, D, or other suitable bait, said bait being laid on a shelf, E, at the rear end of the box.

When the animal enters the box and endeavors to remove the bait from the shelf, the bait drops down and pulls out the wedge $f$, thereby releasing the wedge $b$, and allowing the door C to drop instantly, thereby confining the animal in the box.

In the top of the box A is a suitable door, G, for placing the bait in position.

Having thus fully described my invention, what I claim as new, and desire to secure by Letters Patent, is—

The combination of the box A, provided with the vertically-sliding door C and interior shelf E, the blocks $d\ e$, wedges $b\ f$, strings $a\ i$, and bait D, all arranged substantially as and for the purposes herein set forth.

In testimony that I claim the foregoing as my own I affix my signature in presence of two witnesses.

JOSEPH J. HAYDEN.

Witnesses:
 THOMAS WHITE,
 SOLOMON J. HANSAKER.